United States Patent
Chung et al.

(10) Patent No.: US 10,328,581 B2
(45) Date of Patent: Jun. 25, 2019

(54) METHOD AND DEVICE FOR ROBOTIC DIRECT LEAD-THROUGH TEACHING

(71) Applicant: INDUSTRIAL TECHNOLOGY RESEARCH INSTITUTE, Hsin-Chu (TW)

(72) Inventors: Wei-Der Chung, Taipei (TW); Chun-Chieh Wang, Hsinchu (TW); Ping-Cheng Hsieh, Miaoli County (TW); Xiao Hu, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 125 days.

(21) Appl. No.: 15/338,864

(22) Filed: Oct. 31, 2016

(65) Prior Publication Data
US 2017/0312917 A1 Nov. 2, 2017

(30) Foreign Application Priority Data
Apr. 29, 2016 (TW) ................ 105113486 A

(51) Int. Cl.
*B25J 13/08* (2006.01)
*G05B 19/423* (2006.01)
*B25J 9/16* (2006.01)

(52) U.S. Cl.
CPC .......... *B25J 13/085* (2013.01); *B25J 9/1664* (2013.01); *G05B 19/423* (2013.01);
(Continued)

(58) Field of Classification Search
CPC ...... B25J 9/1664; B25J 13/085; B25J 9/1633; B25J 9/163; G05B 19/423;
(Continued)

(56) References Cited

U.S. PATENT DOCUMENTS 4,408,286 A * 10/1983 Kikuchi ................. B25J 9/046
318/568.14
4,608,651 A   8/1986 Murakami et al.
(Continued)

FOREIGN PATENT DOCUMENTS

CN   1200691 A    12/1998
CN   102431033 A   5/2012
(Continued)

OTHER PUBLICATIONS

Intellectual Property Office Ministry of Economic Affairs, R.O.C., "Office Action", dated Sep. 14, 2017, Taiwan.
(Continued)

*Primary Examiner* — Dale Moyer
(74) *Attorney, Agent, or Firm* — Locke Lord LLP; Tim Tingkang Xia, Esq.

(57) ABSTRACT

A device for robotic direct lead-through teaching includes a robot, a replacing member and a lead-through teaching member. The robot has an operation member coupled with the replacing member. The lead-through teaching member mounted replaceably at the replacing member has a force sensor. The force sensor has six-axis load information. A path teaching is executed manually upon the operation member of the robot so as to store coordinate information. In additional, a method for robotic direct lead-through teaching is also provided.

25 Claims, 8 Drawing Sheets

(52) U.S. Cl.
CPC ........... *G05B 2219/36418* (2013.01); *G05B 2219/39529* (2013.01); *G05B 2219/40586* (2013.01); *Y10S 901/03* (2013.01); *Y10S 901/46* (2013.01)

(58) Field of Classification Search
CPC .......... G05B 2219/36418; G05B 2219/39529; G05B 2219/40586; G05B 2219/39187; G05B 2219/39194; Y10S 901/03; Y10S 901/476; Y10S 901/46
See application file for complete search history.

(56) References Cited

U.S. PATENT DOCUMENTS

| | | |
|---|---|---|
| 4,740,126 A | 4/1988 | Richter |
| 5,051,675 A | 9/1991 | Okumura et al. |
| 5,783,922 A | 7/1998 | Hashimoto et al. |
| 5,880,956 A | 3/1999 | Graf |
| 6,160,324 A | 12/2000 | Terada et al. |
| 6,212,443 B1 | 4/2001 | Nagata et al. |
| 6,222,338 B1 | 4/2001 | Villaret |
| 6,285,920 B1 | 9/2001 | McGee et al. |
| 6,385,508 B1 | 5/2002 | McGee et al. |
| 7,328,120 B2 | 2/2008 | Hirabayashi |
| 8,489,236 B2 | 7/2013 | Fudaba et al. |
| 8,792,655 B2 | 7/2014 | Chen et al. |
| 2006/0178775 A1 | 8/2006 | Zhang et al. |
| 2010/0312391 A1 | 12/2010 | Choi et al. |
| 2010/0312392 A1 | 12/2010 | Zimmermann |
| 2012/0130541 A1* | 5/2012 | Szalek .................. B25J 9/106 700/258 |
| 2013/0110290 A1 | 5/2013 | Geffard et al. |
| 2014/0114477 A1 | 4/2014 | Sato et al. |
| 2015/0217445 A1* | 8/2015 | Hietmann ............ B25J 9/0081 700/264 |
| 2015/0323398 A1* | 11/2015 | Lauzier ................ B25J 9/0081 73/862.08 |
| 2017/0254709 A1* | 9/2017 | Lauzier ................ B25J 9/0081 |

FOREIGN PATENT DOCUMENTS

| | | |
|---|---|---|
| CN | 103425100 A | 12/2013 |
| DE | 3211992 A1 | 10/1983 |
| EP | 2184659 A1 | 5/2010 |
| JP | 2004105791 A | 4/2004 |
| JP | 2004281750 A | 10/2004 |
| TW | I459171 B | 11/2014 |
| WO | 9707941 A1 | 3/1997 |
| WO | 2010088959 A1 | 8/2010 |
| WO | 2013192500 A2 | 12/2013 |
| WO | 2014110682 A1 | 7/2014 |

OTHER PUBLICATIONS

Jianjun Wang et al., A Force Control Assisted Robot Path Generation System, 4th IEEE on Automation Science and Engineering, 2008, 528-533.
Gregory F. Rossano et al., Easy Robot Path Programming Concepts: An Industrial Perspective, IEEE International Conference on Automation Science and Engineering, 2013, 1119-1126.
Mohsen Moradi Dalvand et al., Improvements in Teleoperation of Industrial Robots without Low-Level Access, IEEE International Conference on Systems, Man and Cybernetics, 2014, 2170-2175.
Sang Choi et al., Lead-Through Robot Teaching, IEEE, 2013.
Hui Zhang et al., Machining with Flexible Manipulator: Toward Improving Robotic Machining Performance, Proceedings of the 2005 IEEE/ASME International Conference on Advanced Intelligent Mechatronics, 2005, 1127-1132.
Jingguo Ge et al., Robotic Machining: A Force-Control-Based Fast Programming Method, IEEE, 2008, 730-735.
China Patent Office, "Office Action", dated Mar. 7, 2019, China.

* cited by examiner

100

100

METHOD AND DEVICE FOR ROBOTIC DIRECT LEAD-THROUGH TEACHING

CROSS REFERENCE TO RELATED APPLICATION

This application also claims priority to Taiwan Patent Application No. 105113486 filed in the Taiwan Patent Office on Apr. 29, 2016, the entire content of which is incorporated herein by reference.

TECHNICAL FIELD

The present disclosure relates to a method and a device for guiding forces, and more particularly to the method and the device for robotic direct lead-through teaching.

BACKGROUND

Conventionally, the technique of "teaching" a robot the instant position and direction by manually manipulating the robot to the desired position and direction usually applies at least an operational button/node or rotation/shifting node on a control panel to control the movement of the robot so as to teach the control unit of the robot (robotic teaching by repetitions).

However, the aforesaid teaching by repetitions needs selectively to manipulate a plurality of operational buttons so as able to define clearly the moving path of the robot. The operational buttons typically for axial displacements and rotations (for example, with respect to an X-Y-Z orthogonal coordinate system) usually require plenty of operation time for memorizing and thus able to establish a relationship between the operational buttons and the robotic movement. In particular, in the case that the user is not familiar to the operations, risks in error operations could be possible, and then the robot would face an incident to hit the proximate objects or the user himself or herself.

In addition, sine the robot is important to this stage of automatic industry, thus the teaching to the robot is not only basic but also crucial for the robotic manufacturing. It shall be understood herein that the term "teaching" for robots is the procedure to set up manually an orderly work scheme to a robot with a built-in memory device. According to the teaching information stored to the memory device of the robot purposely by the user, the desired or taught positions, velocities, stretching, flexing, displacing, rotating, and complicated motions can be repeated orderly by the robot. However, currently, the conventional robotic teaching may be various but can't present usually a satisfied service. Too many language formats is a problem, and lack of a dynamic simulation system to verify the teaching is also another critical problem. Generally, for the conventional robotic teaching usually requires a computer for command input, the practice to be familiar with the computer forms another operational difficulty for most of new users to the robotic teaching.

SUMMARY

The present disclosure is to provide a method for robotic direct lead-through teaching. During the teaching, the manufacturer's teach pendant is no more required, and the user needs only to manipulate directly the robot to experience and then memorize automatically each of the motion points, such that the taught work scheme including forcing, displacements, velocities, accelerations and more the like upon the robot can be faithfully repeated.

In this disclosure, the device for robotic direct lead-through teaching provides a lead-through teaching member to be replaceably mounted at the robot so as to obtain the velocity information and the coordinate information of the robot, without further input or adjustment of the motor model (for specific torque or circuit loop) and internal control module for special considerations in kinematics, dynamics and the like. Thus, the application of the device and method in this disclosure is not limited to the internal control module of the robot, but can be relevant to almost all kinds of industrial robots.

In this disclosure, the method for robotic direct lead-through teaching includes a step of providing a force sensor replaceably mounted at a robot and having six-axis load information, and a step of performing a path teaching upon the robot. The path teaching further includes: a step of performing a force-guide mode upon the robot; a step of updating velocity information to the robot, the velocity information being obtained by integrating the six-axis load information; a step of updating coordinate information to the robot, the coordinate information being obtained by integrating the velocity information of the robot; and, a step of determining if the path teaching is complete, returning to perform the force-guide mode upon the robot if negative, storing the coordinate information if positive.

In this disclosure, the device for robotic direct lead-through teaching includes a robot, a replacing member and a lead-through teaching member. The robot has an operation member coupled with the replacing member. The lead-through teaching member replaceably mounted at the replacing member further includes a force sensor having six-axis load information. The operation member of the robot performs a path teaching upon the robot by executing a force-guide mode on the robot so as to store coordinate information.

By providing the method and the device for robotic direct lead-through teaching, since the lead-through teaching member including the force sensor is replaceably mounted at the replacing member located at one end of the robot arm, so that the lead-through teaching member is easier to be assembled and/or disassembled. Namely, by adding the removable lead-through teaching member to the robot in accordance with the present disclosure, the force sensor can be easier and more precise to obtain the velocity information and the coordinate information of the robot, without further input or adjustment of the motor model (for specific torque or circuit loop) and internal control module for special considerations in kinematics, dynamics and the like. Thus, the application of the device and method in this disclosure is not limited to any specific type of the internal control module of the robot, but can be relevant to almost all kinds of industrial robots. Upon such an arrangement, the merits of the path teaching can be provided to all kinds of robots and robotic apparatuses.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
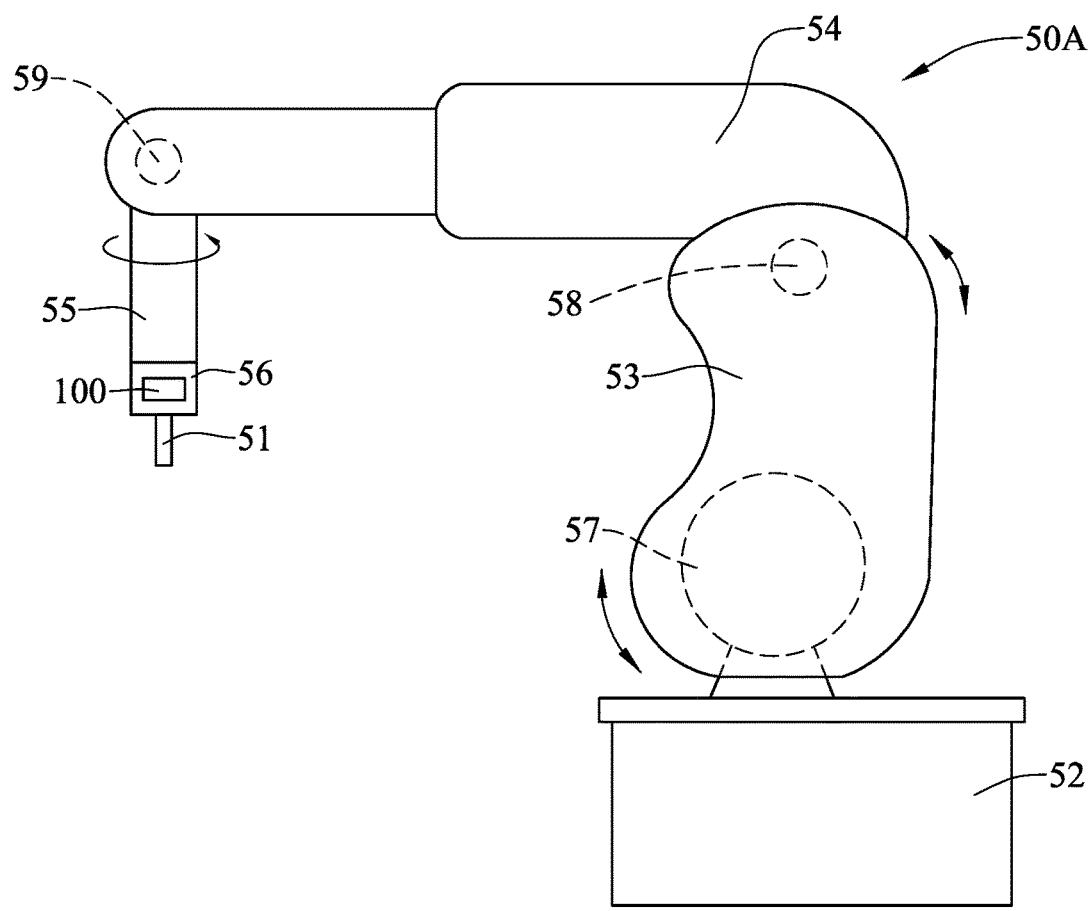
FIG. 1 is a schematic view of a preferred device for robotic direct lead-through teaching in this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
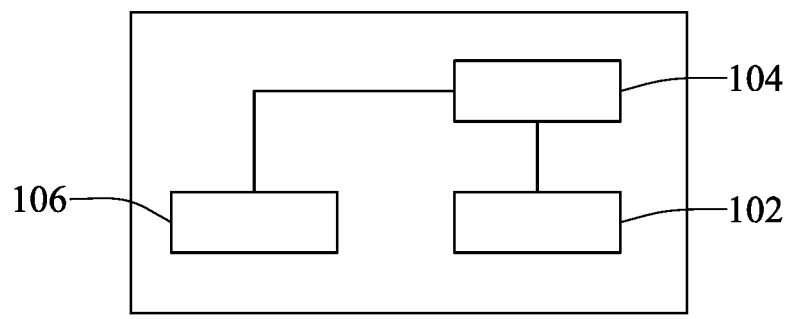
FIG. 2 is a schematic block view of an embodiment of the lead-through teaching member of FIG. 1.

Refer now to FIG. 1 and FIG. 2; where FIG. 1 is a schematic view of a preferred device for robotic direct lead-through teaching in this disclosure, and FIG. 2 is a schematic block view of an embodiment of the lead-through teaching member of FIG. 1. In this embodiment, as shown in FIG. 1, the device 50 for robotic direct lead-through teaching includes a robot 50A and a lead-through teaching member 100.

In FIG. 1, the robot 50A can be, but not limited to, a robot arm. The robot 50A includes an operation member 51, a base 52, a first rotating member 53, a second rotating member 54, a third rotating member 55, a replacing member 56, a first pivotal shaft 57, a second pivotal shaft 58 and a third pivotal shaft 59. The first rotating member 53 is pivotally mounted at the base 52 via the first pivotal shaft 57, the second rotating member 54 is pivotally connected with the first rotating member 53 via the second pivotal shaft 58, and the third rotating member 55 is pivotally connected to one end of the second rotating member 54 via the third pivotal shaft 59.

The third rotating member 55 of the robot 50A can be a robot arm for grasping an object or performing a task. One end of the replacing member 56 is connected to the rotating member 55 of the robot 50A, while another end thereof is coupled with the operation member 51.

The lead-through teaching member 100 is replaceably mounted at the replacing member 56.

In detail, as shown in FIG. 2, the lead-through teaching member 100 includes a controller 102, a force sensor 104 and a calibration element 106, in which the controller 102 is coupled electrically with the force sensor 104, and the force sensor 104 is further coupled electrically with the calibration element 106.

The force sensor 104 has a six-axis load information for providing force information and torque information, in which the force information further includes X-axial force information Fx, Y-axial force information Fy and Z-axial force information Fz, while the torque information further includes X-axial torque information Rx, Y-axial torque information Ry and Z-axial torque information Rz.

Upon such an arrangement, a user can use his/her hand/hands to hold the operation member 51 so as to perform path teaching upon the operation member 51 of the robot 50A. Typically, the path teaching is to execute a force-guide mode to the robot 50A so as to obtain coordinate information. Details of the method for robotic direct lead-through teaching would be elucidated as follows, by accompanying figures.

Figure 3:
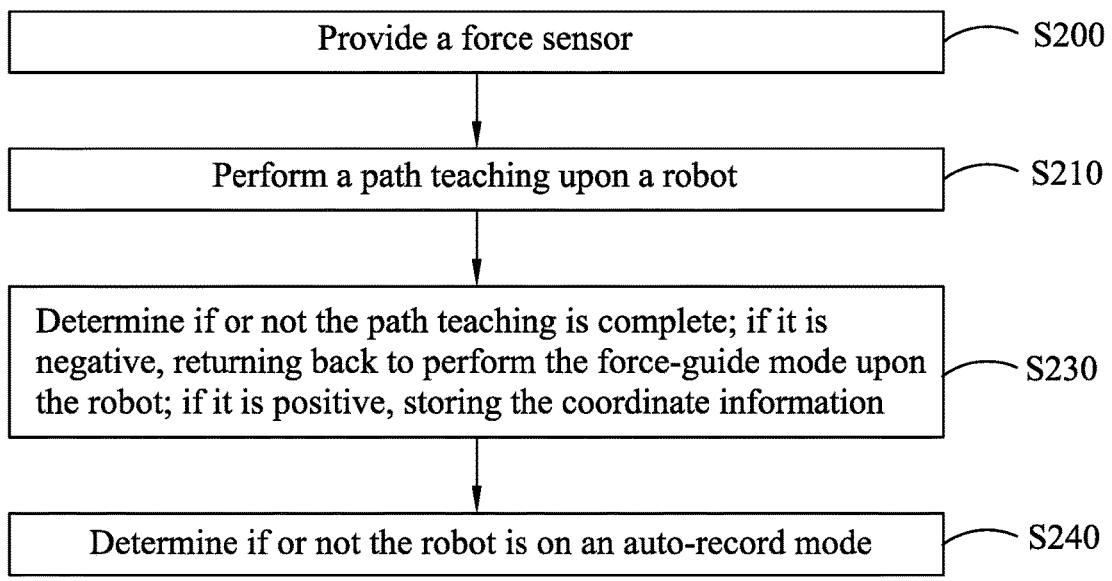
FIG. 3 is a flowchart of a preferred method for robotic direct lead-through teaching in this disclosure.
Figure 4:
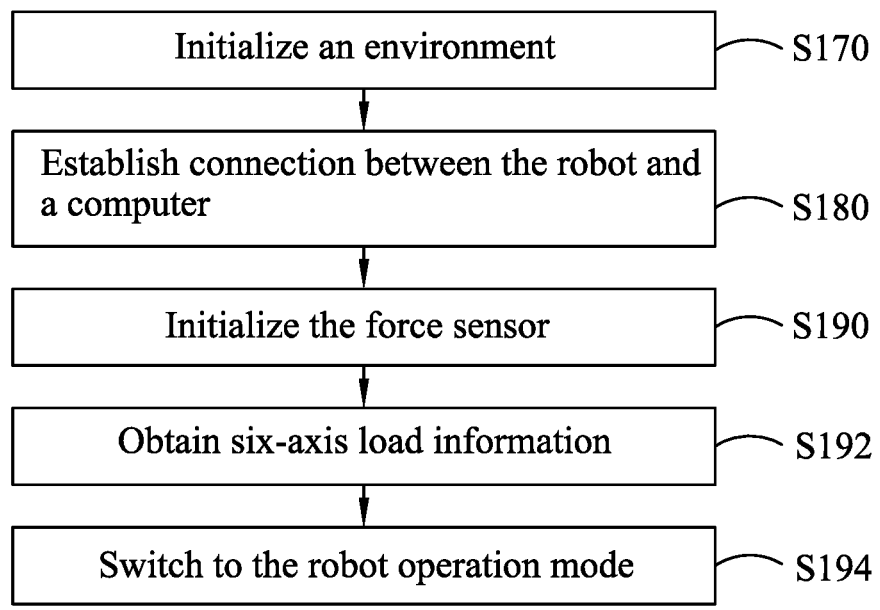
FIG. 4 is a flowchart for a process to initialize the method of FIG. 3.

Refer now to FIG. 3 and FIG. 4; where FIG. 3 is a flowchart of a preferred method for robotic direct lead-through teaching in this disclosure, and FIG. 4 is a flowchart for a process to initialize the method of FIG. 3.

As shown in FIG. 3, this embodiment of the method S20 for robotic direct lead-through teaching includes Step S200 to Step S240. Step S170 to Step S194 shown in FIG. 4 are pre-steps for initializing the method S20 for robotic direct lead-through teaching.

As shown in FIG. 4, Step S170 is firstly performed to initialize an environment.

Then, Step S180 is performed to establish connection between the robot 50A and a computer or server.

Then, perform Step S190 to initialize the force sensor.

In this embodiment, the aforesaid initialization is applied to the force sensor 104 of the lead-through teaching member 100.

After the initialization of FIG. 4, the method S20 for robotic direct lead-through teaching of FIG. 3 can be performed. In Step S200, the force sensor 104 is furnished by being replaceably mounted at the robot, in which the force sensor 104 can provide six-axis load information.

Referring back to FIG. 1 and FIG. 2, the force sensor 104 of the lead-through teaching member 100 is replaceably mounted to the replacing member 56 of the robot 50A. After the force sensor 104 is replaceably mounted at the replacing member 56 of the robot 50A, a load-sampling loop is performed to erase an load deviation, so that the force sensor 104 can fetch the required six-axis load information (Step S192 of FIG. 4). in this embodiment, the six-axis load information provides force information and torque information; in which the force information further includes X-axial force information Fx, Y-axial force information Fy and Z-axial force information Fz, and the torque information further includes X-axial torque information Rx, Y-axial torque information Ry and Z-axial torque information Rz.

Then, switch to the robot operation mode (Step S194 of FIG. 4) so as to have the robot able to perform displacements, rotations and hybrid movements including both displacements and rotations. In particular, the force sensor 104 of this disclosure is embodied as a six-axis force sensor, such that the robot 50A can be switched and thus operated around six-axis degrees of freedom. Namely, the robot 50A with the force sensor 104 can be controllable with six-axis degrees of freedom.

Then, in performing Step S210, the path teaching is applied to the robot. In this embodiment, the path teaching is a force-sampling loop including the following Step 212 to Step S216. A flowchart of the path flow is demonstrated in FIG. 5.

Figure 5:
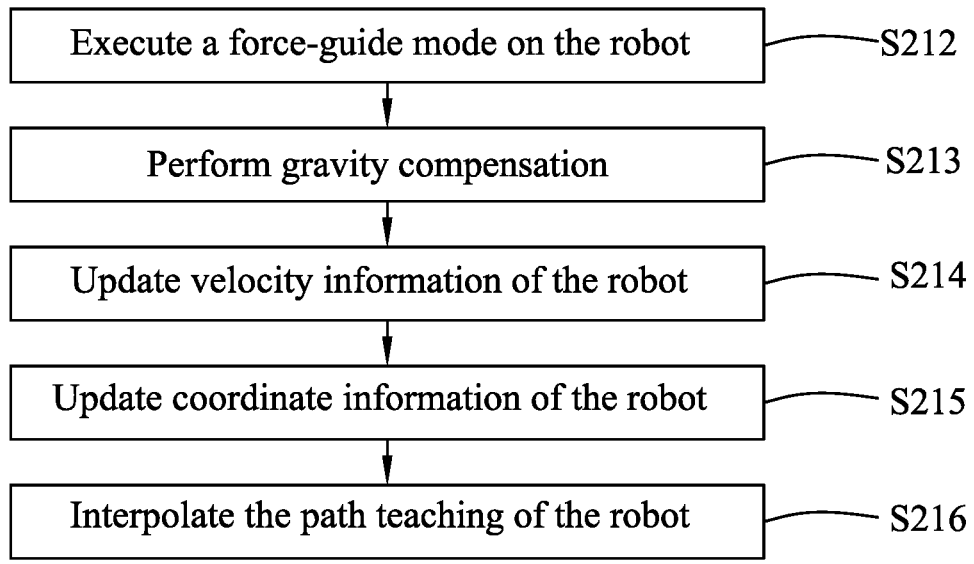
FIG. 5 is a flowchart to execute path teaching upon a robot in accordance with the present disclosure.

Referring now to FIG. 5, a flowchart to execute the path teaching upon a robot in accordance with the present disclosure is showed.

Firstly, perform Step S212 to execute a force-guide mode on the robot.

Practically, the execution of the force-guide mode on the robot is to move the robot 50A by inputting an external force and also to record each individual six-axis load information of the robot 50A all the way during the path teaching.

Referring to FIG. 1, the user may use his/her hand to push the operation member 51 so as to move the robot 50A. While in moving the robot 50A, every single six-axis load information of the robot during the path teaching is memorized, in which the six-axis load information includes the X-axial force information Fx, the Y-axial force information Fy, the Z-axial force information Fz, the X-axial torque information Rx, the Y-axial torque information Ry and the Z-axial torque information Rz.

Then, in the following Step S213, gravity compensation is performed.

In this embodiment, while the robot executes the force-guide mode, the calibration element 106 as shown in FIG. 2 can be introduced to perform the gravity compensation.

In Step S214, velocity information of the robot is updated by integrating the six-axis load information.

In this embodiment, a velocity-sampling loop can be performed to obtain the updated velocity information by utilizing an integrating element in the controller 102 of FIG. 2 to integrate individually the X-axial force information Fx, the Y-axial force information Fy, the Z-axial force information Fz, the X-axial torque information Rx, the Y-axial torque information Ry and the Z-axial torque information Rz. In this disclosure, the velocity information includes velocities and angular velocities of the robot 50A.

Practically, when a user is able to use his/her hand to move the operation member 51 so as further to move the robot 50A simultaneously, the robot 50A exerted by such an external force would obtain a corresponding acceleration in the direction of the external force, and the acceleration is proportional to the external force, but is inversely proportional to the mass of the robot 50A according to Newton's second law of motion. In this embodiment, while in moving the robot 50A along the teaching path, the six-axis load information including the X-axial force information Fx, the Y-axial force information Fy, the Z-axial force information Fz, the X-axial torque information Rx, the Y-axial torque information Ry and the Z-axial torque information Rz can be obtained. By having the X-axial force information Fx in the X-axial direction as an example, the velocity in the X-axial direction can be obtained directly by integrating the X-axial force information Fx through the integrating element, according to Newton's second law of motion, where the mass of the robot 50A for the integration is known to be a constant. Similarly, the Y-axial force information Fy and the Z-axial force information Fz can be individually integrated by the integrating element so as to obtain the velocities in the Y-axial and Z-axial directions, respectively.

For the angular moments, the angular acceleration is proportional to the angular moment, but is inversely proportional to the moment of inertia, in which the moment of inertia is related to the mass and the radius of gyration of the robot 50A, both of which are known to be constant. The X-axial torque information Rx can be integrated by the integrating element so as to obtain the angular velocity in the X-axial direction, and similarly the Y-axial torque information Ry and the Z-axial torque information Rz can be individually integrated by the integrating element so as to obtain the angular velocities in the Y-axial and Z-axial directions, respectively.

In performing Step S215, coordinate information of the robot is updated, in which the coordinate information is obtained by integrating the velocity information of the robot.

In this embodiment, after the velocities and the angular velocities of the robot are obtained from performing Step S214, in this Step S215, the integrating element in the controller 102 of FIG. 2 can be applied to integrate the velocities and the angular velocities of the robot 50A so as to obtain the coordinate information, respectively, for updating the coordinate information of the robot.

In the aforesaid Step S214 and Step S215, the relationship of accelerations, velocities and displacements is clear. While in guiding or teaching the robot 50A, the built-in or internal encoders of the robot 50A would furnish the position information, and the force sensor 104 would furnish the acceleration information corresponding to the external force upon the robot 50A during the path teaching. Then, the control system would base on the function of spatial status $\dot{x}=ax+bu$ to perform integration upon the polynomial of the foregoing function, so that a polynomial for the velocity can be obtained. In the aforesaid function, the u is a variable standing for the force or the acceleration. Similarly, the coordinate information for updating the robot 50A can be obtained by integrating the polynomial $y=cx+du$.

Based on the aforesaid calculations, the position commands originally in the internal encoders of the robot 50A can then be modulated, and the force information can be used indirectly to update the velocity commands and the coordinate information of the robot 50A. Similarly, the relationship among the angular acceleration, the angular velocity and the angular displacement of the robot 50A can be derived. Further, by providing the input from the force sensor 104 to switch the robot 50A to perform a guiding function upon the displacement and the rotations, then a mode with six-axis (or simply say "six") degrees of freedom can be achieved.

After the coordinate information of the robot is updated in Step S215, Step S216 is performed to interpolate the path teaching upon the robot.

It shall be understood that, in a manufacturer's robotic control commands, a linear relationship matrix for the position and the velocity is usually provided. Generally, this linear relationship matrix is used to update dynamically the commands while the relationship between the acceleration and the velocity is changed due to involvement of a guiding force, such that the guiding can be much smoother. However, in this embodiment of the present disclosure, the interpolation method in Step S216 is to resolve the discontinuity in the path teaching.

Referring back to FIG. 3, in Step S230, it is determined if or not the path teaching is complete. If negative, go back to the force-sampling loop to perform the force-guide mode again upon the robot (Step S212) so as to obtain the required coordinate information. Otherwise, if positive (i.e. the path teaching is finished), then save the coordinate information.

In this embodiment, if the robot path teaching is not complete, the robot force-guide mode is performed continuously till the robotic path teaching is finished.

If the robotic path teaching is finished, the coordinate information and the velocity information are stored to the robot 50A. Then, Step S240 is performed to switch to the auto-record mode.

In Step S240, if the robot 50A is judged to be on the auto-record mode, the auto execution is performed and the velocity is inquired. The updated coordinate information and velocity information are forwarded and then stored into the controller 102 of FIG. 2 (for example, in the memory of a computer or server). Hence, the method for robotic direct lead-through teaching S20 is completely executed and thus ended. After the aforesaid path teaching process of this disclosure is performed upon the robot 50A, the robot 50A can then automatically follow the taught path so as to repeat orderly the stretching, flexing, displacing, rotating, and complicated motions that the user desired. Else, in Step S240, if the robot 50A is judged not to be necessary onto the auto-record mode, no switch to the auto-record mode is required, and the corresponding commands are stored into the controller 102 of FIG. 2 (for example, in the memory of a computer or server).

In the aforesaid method and device of the present disclosure, the lead-through teaching member 100 including the force sensor 104 is replaceably mounted at the replacing member 56, and the replacing member 56 is also replaceably located at a free end of the robot arm. It implies that, in this disclosure, the lead-through teaching member 100 is added to the robot 50A in a pluggable manner. By utilizing the force sensor 104, the velocity information and the coordinate information for the robot 50A can be easily obtained, without further input or adjustment of the motor model (for specific torque or circuit loop) and internal control module for special considerations in kinematics, dynamics and the like. Thus, the application of the device and method in this disclosure is not limited to the internal control module of the robot, but can be relevant to almost all kinds of industrial robots.

In addition, the lead-through teaching member 100 is simply attached to the replacing member 56 located at the free end of the robot 50A, and then the task of teaching the robot can be easily carried out. Consequently, the goal in saving the cost can be achieved.

Furthermore, the application of the aforesaid method and device of the present disclosure are not limited to a robot. Practically, in the automation industry, the removable lead-through teaching member 100 of the present disclosure can be removed from one robot after experiencing the path teaching, and then relocated to another robot for another path teaching, such that the goal of multi-machine sharing can be achieved. In addition, since a common lead-through teaching member 100 is used, so it can be ensured that a plurality of robots using the same lead-through teaching member 100 can perform the same task in the same order.

Figure 6:
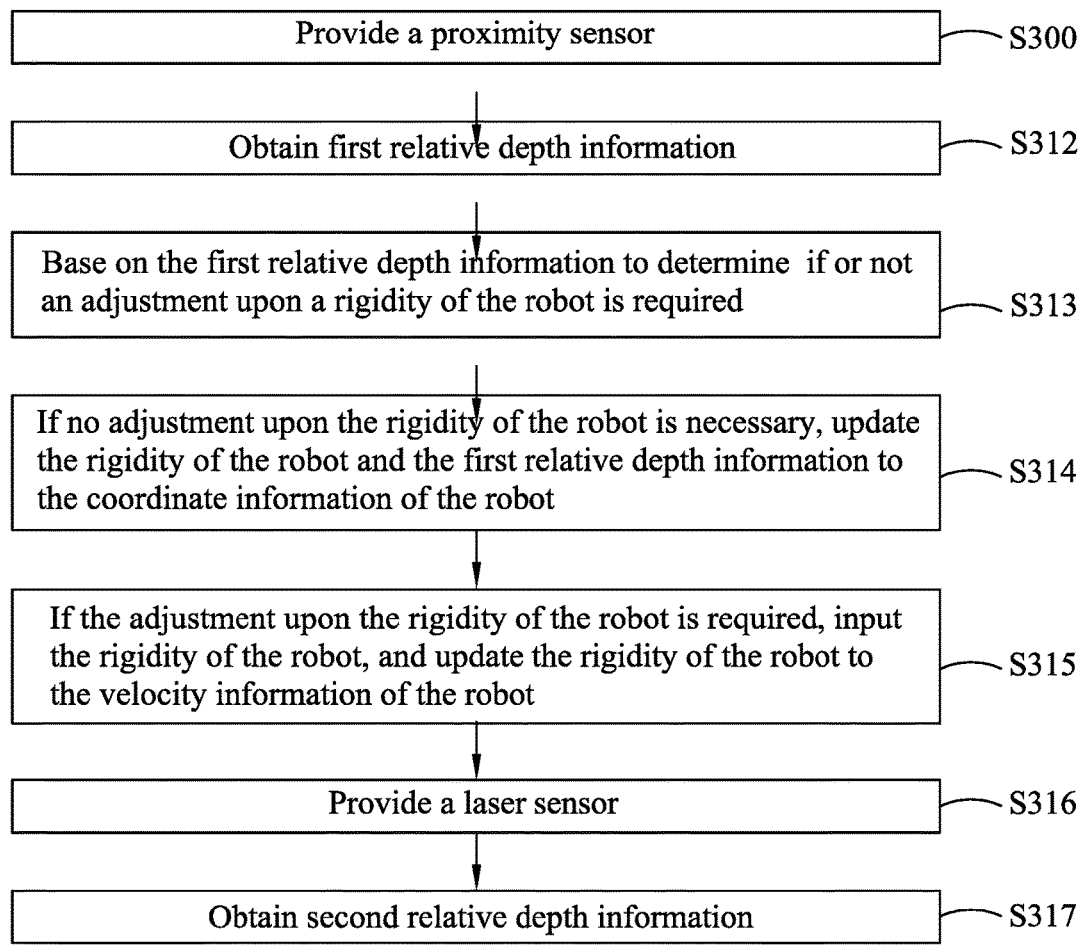
FIG. 6 is a flowchart of an exemplary embodiment for the method for robotic direct lead-through teaching in accordance with the present disclosure.
Figure 7:
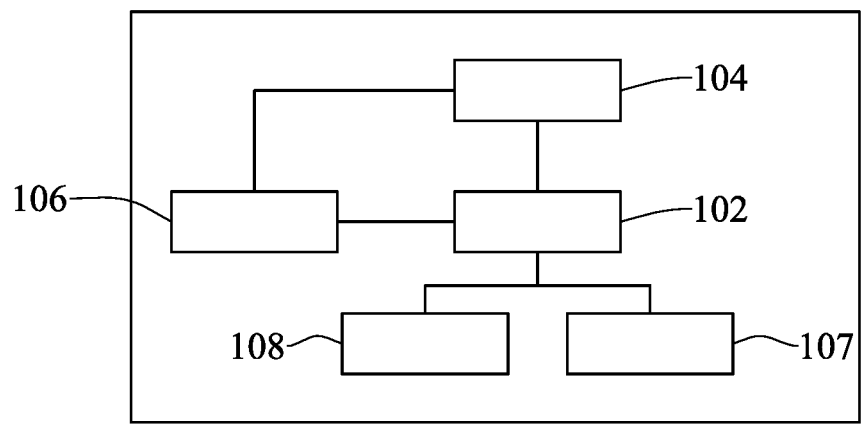
FIG. 7 is a schematic block view of an exemplary embodiment for the lead-through teaching member in accordance with the present disclosure.
Figure 8:
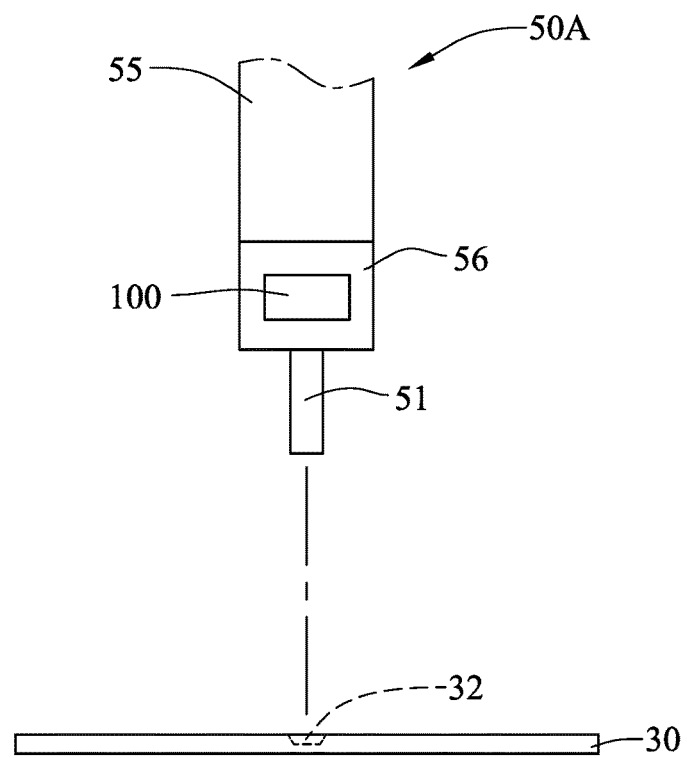
FIG. 8 shows schematically an exemplary application of the device for robotic direct lead-through teaching in accordance with the present disclosure.
Figure 9:
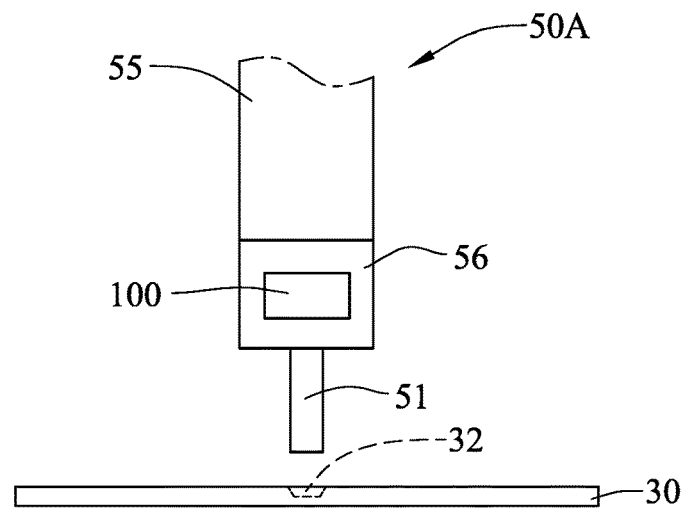
FIG. 9 demonstrates another state of FIG. 8.

Refer now to FIG. 6 through FIG. 9; where FIG. 6 is a flowchart of an exemplary embodiment for the method for robotic direct lead-through teaching in accordance with the present disclosure, FIG. 7 is a schematic block view of an exemplary embodiment for the lead-through teaching member in accordance with the present disclosure, FIG. 8 shows schematically an exemplary application of the device for robotic direct lead-through teaching in accordance with the present disclosure, and FIG. 9 demonstrates another state of FIG. 8.

Referring to FIG. 8, a circuit board 30 is located under the operation member 51, and a work piece is placed on the circuit board 30. In this embodiment, the work piece is a hole 32 to be locked. Namely, the application in this embodiment is to teach a robot to perform a locking task at the circuit board. However, the application of the instant method and device is not limited to this locking task at the circuit board.

Referring now to FIG. 7, the lead-through teaching member 100 herein is resembled to the lead-through teaching member 100 of FIG. 2. Elements of FIG. 7 that are identical to those of FIG. 2 are assigned by the same numbers, and details thereabout would be omitted herein.

As shown in FIG. 7, the lead-through teaching member 100 further includes a proximity sensor 107 and a laser sensor 108, in which the proximity sensor 107 and the laser sensor 108 are individually coupled with the controller 102.

Referring back to FIG. 6, the method for robotic direct lead-through teaching S30 applied to the embodiment of FIG. 7 can include Step S300 to Step S317.

In Step S300, the proximity sensor 107 is provided.

Step S170 to Step S190 of FIG. 4 are applied here to initialize the force sensor 104 and the proximity sensor 107.

Then, Step S312 is performed to obtain first relative depth information.

In this embodiment, as shown in FIG. 8, the first relative depth information is the distance between the operation member 51 and the locking hole 32 of the circuit board 30. Namely, while in performing Step S212 of FIG. 5 to perform the force-guide mode on the robot, except for manually holding the operation member 51 to move the robot and record the each of the six-axis load information of the robot during the path teaching, the proximity sensor 107 can be further applied to obtain the first relative depth information. Namely, the proximity sensor 107 is introduced to detect the relative distance from the operation member 51 of the robot 50A to the work piece. In some other embodiments, visual sensors can be also applied to provide the same service.

Then, in Step S313, the first relative depth information is used to determine if or not the rigidity of the robot 50A needs to be adjusted.

It shall be noted that, while the robot 50A is in the path teaching, the relative depth information is required to enhance the position precision. According to Hooke's law $F=k \times \Delta x$, a linear relationship exists between the external force F applied to the robot 50A and the rigidity k, or between the external force F and the displacement $\Delta x$. When the operation member 51 of the robot 50A (i.e. the free end of the robot 50A) approaches the work piece, the rigidity k of the robot 50 shall be increased so as to allow the user to exert a predetermined force and further to reduce proportionally the displacement $\Delta x$. Such a move is equivalent to reduce the velocity of the robot 50A so as thereby to enhance the operational precision. Similarly, when the operation member 51 of the robot 50A (i.e. the free end of the robot 50A) retrieves from the work piece, the rigidity k of the robot 50 shall be decreased so as to increase the velocity of the robot 50A. Though such a move may decrease the operational precision, yet, since the resolution in displacement of the robot 50A at the early stage of the path teaching is not a key factor to affect the final position precision, the robot 50A can thus be taught in the state of a higher velocity and lower rigidity.

Then, in Step S314, while the rigidity of the robot is judged to be no need to be adjusted, the rigidity of the robot and the first relative depth information are updated to the coordinate information of the robot.

On the other hand, in Step S315, while the rigidity of the robot is judged to be necessary to be adjusted, then a new rigidity of the robot is inputted and updated to the velocity information of the robot.

In the aforesaid Step S313 through Step S315, as shown in FIG. 8, if the distance between the operation member 51 of the robot 50A and the circuit board 30 is relative far, and if the preset rigidity of the robot 50A is low and easy to be pulled manually by the user, then it is judged that no need is required to adjust the rigidity of the robot 50 (Step S314).

At this time, the rigidity of the robot 50A and the first relative depth information are updated to the coordinate information of the robot 50A. Therefore, a corresponding rigidity shall be inputted in Step S215 of FIG. 5 so as to update the coordinate information of the robot 50A thereafter. On the other hand, if the rigidity of the robot 50A is high and thus uneasy to be pulled manually by the user, then it is judged that a need is required to adjust the rigidity of the robot 50 (Step S315). At this time, the rigidity of the robot 50A is reduced so as to make easy for manually pulling the robot 50A, and the velocity information for performing the path teaching upon the robot 50A varies as well. Therefore, a corresponding rigidity shall be inputted in Step S214 of FIG. 5 so as to update the velocity information of the robot 50A thereafter.

Comparatively, referring to FIG. 9, it shows that the operation member 51 of the robot 50A is closer to the circuit board 30. At this time, if the preset rigidity of the robot 50A is low so that the user can easily pull to teach the robot 50A, then the rigidity of the robot 50A shall be increased (Step S315) so as to enhance the structural rigidity of the robot 50A and thus to prevent the robot 50A from hitting the circuit board 30 due to possible position bias caused by the inertia of the robot 50A including the load thereon. Also, the position precision of the path teaching can be ensured as well. On the other hand, if the preset rigidity of the robot 50A is high so that the user is more difficult to pull the robot 50A, then the rigidity of the robot 50A shall be maintained (Step S314). Then, the rigidity of the robot 50A and the first relative depth information are updated to the coordinate information of the robot 50A.

Further, as shown in FIG. 9, when the operation member 51 of the robot 50A is close to the circuit board 30 and it is determined that no adjustment in the rigidity of the robot 50A is necessary, then the following Step S316 to Step S317 can be included.

In Step S316, a laser sensor 108 is provided.

Then, in Step S317, second relative depth information is obtained, in which a value of the second relative depth information is smaller than or equal to that of the first relative depth information.

In this embodiment, the operation member 51 of the robot 50A is close to the work piece on the circuit board 30, the laser sensor 108 featured in precision detection can be selectively chosen to detect the relative distance between the operation member 51 of the robot 50A and the work piece, so that precision positioning and the yield of the fastening task can be ensured.

In summary, by providing the method and the device for robotic direct lead-through teaching, since the lead-through teaching member including the force sensor is replaceably mounted at the replacing member located at one end of the robot arm, so that the lead-through teaching member is easier to be assembled and/or disassembled. Namely, by adding the removable lead-through teaching member to the robot in accordance with the present disclosure, the force sensor can be easier and more precise to obtain the velocity information and the coordinate information of the robot, without further input or adjustment of the motor model (for specific torque or circuit loop) and internal control module for special considerations in kinematics, dynamics and the like. Thus, the application of the device and method in this disclosure is not limited to any specific type of the internal control module of the robot, but can be relevant to almost all kinds of industrial robots. Upon such an arrangement, the merits of the path teaching can be provided to all kinds of robots and robotic apparatuses.

In addition, since the lead-through teaching member is simply mounted to the replacing member at the end of the robot arm in a removable manner, thus the aforesaid functions of the robotic path teaching and the cost-down benefit therefrom can be obtained, without adding additional sensors to any pivotal shaft of the robot.

Further, since the lead-through teaching member of the present disclosure is attached to the replacing member at the free end of the robot arm, so no manufacturer's teach pendant is needed anymore to perform the path teaching. By having the user to manually pull the robot directly so as to carry out the path teaching, then each of the motion points can be automatically recorded or derived, such that the desired path for the robot to follow can be precisely repeated and easier adjusted. Also, force tracking upon the robot motion can be conveniently attained.

Furthermore, the application of the aforesaid method and device of the present disclosure are not limited to a specific robot. In the automation industry, the removable lead-through teaching member of the present disclosure can be removed from one robot after experiencing the path teaching, and then relocated to another robot for another path teaching, such that the goal of multi-machine sharing can be achieved. In addition, since a common lead-through teaching member 100 is used, so it can be ensured that a plurality of robots using the same lead-through teaching member 100 can perform the same task in the same order.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A robotic direct lead-through teaching method, comprising the following steps:
   providing a force sensor being replaceably mounted at a robot has a six-axis load information; and
   performing a path teaching upon the robot, the path teaching further comprising the following steps:
      performing a force-guide mode upon the robot;
      updating a velocity information to the robot, the velocity information is obtained by integrating the six-axis load information;
      updating a coordinate information to the robot, the coordinate information is obtained by integrating the velocity information of the robot; and
      determining if the path teaching is complete; if it is negative, returning back to perform the force-guide mode upon the robot; if it is positive, storing the coordinate information.

2. The method for robotic direct lead-through teaching of claim 1, prior to providing the force sensor, further including a step of initializing the force sensor.

3. The method for robotic direct lead-through teaching of claim 1, prior to providing the force sensor, further including the steps of:
   initializing the force sensor;
   obtaining the six-axis load information; and
   switching an operation mode of the robot.

4. The method for robotic direct lead-through teaching of claim 1, prior to updating the velocity information of the robot, further including a step of executing a gravity compensation.

5. The method for robotic direct lead-through teaching of claim 1, prior to updating the coordinate information of the robot, further including a step of interpolating the path teaching of the robot so as to resolve discontinuity in the path teaching.

6. The method for robotic direct lead-through teaching of claim 1, wherein the velocity information includes a velocity and an angular velocity of the robot.

7. The method for robotic direct lead-through teaching of claim 1, wherein the step of performing the force-guide mode upon the robot is achieved by displacing the robot and recording each of the six-axis load information during the path teaching of the robot.

8. The method for robotic direct lead-through teaching of claim 1, wherein the six-axis load information provides force information and torque information.

9. The method for robotic direct lead-through teaching of claim 1, wherein the step of performing the path teaching upon the robot further includes the steps of:
providing a proximity sensor;
obtaining first relative depth information; and
basing on the first relative depth information to determine if or not an adjustment upon a rigidity of the robot is required.

10. The method for robotic direct lead-through teaching of claim 9, posterior to the step of determining if or not an adjustment upon the rigidity of the robot is required, further including a step of updating the rigidity of the robot and the first relative depth information to the coordinate information of the robot if no adjustment upon the rigidity of the robot is necessary.

11. The method for robotic direct lead-through teaching of claim 9, posterior to the step of determining if or not an adjustment upon the rigidity of the robot is required, further including a step of inputting the rigidity of the robot and updating the rigidity of the robot to the velocity information of the robot if the adjustment upon the rigidity of the robot is required.

12. The method for robotic direct lead-through teaching of claim 9, posterior to a decision that no adjustment upon the rigidity of the robot is necessary, further including the steps of:
providing a laser sensor; and
obtaining second relative depth information, a value of the second relative depth information being smaller than or equal to that of the first relative depth information.

13. The method for robotic direct lead-through teaching of claim 9, wherein, in determining if or not the adjustment upon the rigidity of the robot is required, according to Hooke's law $F=k \times \Delta x$, a linear relationship exists between an external force F applied to the robot and a rigidity k, or between the external force F and a displacement $\Delta x$; wherein, when a free end of the robot approaches a work piece, the rigidity k of the robot is increased so as to reduce proportionally the displacement $\Delta x$, further to reduce a velocity of the robot, and thereby to enhance an operational precision; wherein, when the free end of the robot retrieves from the work piece, the rigidity k of the robot is decreased so as to increase the velocity of the robot.

14. The method for robotic direct lead-through teaching of claim 1, prior to providing the force sensor, further including a step of initializing the proximity sensor.

15. The method for robotic direct lead-through teaching of claim 14, wherein, if the robot is judged to be on the auto-record mode, the robot performs auto execution and the velocity of the robot is inquired.

16. The method for robotic direct lead-through teaching of claim 1, posterior to determining if or not the path teaching is complete, further including a step of determining if or not a need to switch the robot to an auto-record mode.

17. The method for robotic direct lead-through teaching of claim 1, wherein, in updating the velocity information and the coordinate information of the robot, the force sensor furnishes acceleration information corresponding to an external force upon the robot during the path teaching, a control system basing on a function of spatial status $\dot{x}=ax+bu$ to perform integration upon a polynomial of the foregoing function, so that a polynomial for the velocity is obtained, the u being a variable standing for the force or the acceleration, the coordinate information for updating the robot being obtained by integrating a polynomial $y=cx+du$.

18. A robotic direct lead-through teaching device, comprising:
a robot, having an operation member;
a replacing member, coupled with the operation member; and
a lead-through teaching member, replaceably mounted at the replacing member, further including a force sensor having six-axis load information, for performing a path teaching operation upon the operation member of the robot, the path teaching operation is employed to store coordinate information by performing a force-guide mode on the robot,
wherein the path teaching operation comprises:
performing a force-guide mode upon the robot
updating a velocity information to the robot, the velocity information is obtained by integrating the six-axis load information;
updating a coordinate information to the robot, the coordinate information is obtained by integrating the velocity information of the robot; and
determining if the path teaching operation is complete; if it is negative, returning back to perform the force-guide mode upon the robot if it is positive, storing the coordinate information.

19. The device for robotic direct lead-through teaching of claim 18, wherein the six-axis load information provides force information and torque information.

20. The device for robotic direct lead-through teaching of claim 18, wherein the lead-through teaching member further includes a controller coupled with the force sensor.

21. The device for robotic direct lead-through teaching of claim 20, wherein the lead-through teaching member further includes a proximity sensor coupled with the controller.

22. The device for robotic direct lead-through teaching of claim 21, wherein the proximity sensor detects a relative distance between the operation member of the robot and a work piece.

23. The device for robotic direct lead-through teaching of claim 20, wherein the lead-through teaching member further includes a laser sensor coupled with the controller.

24. The device for robotic direct lead-through teaching of claim 23, wherein the laser sensor detects a relative distance between the operation member of the robot and a work piece.

25. The device for robotic direct lead-through teaching of claim 18, wherein the lead-through teaching member further includes a calibration element coupled with the force sensor.

* * * * *